United States Patent
Zhou et al.

(10) Patent No.: US 12,041,548 B2
(45) Date of Patent: Jul. 16, 2024

(54) WAKE-UP SIGNAL RESOURCE DETERMINING METHOD AND APPARATUS, WAKE-UP SIGNAL RESOURCE CONFIGURATION METHOD AND APPARATUS, TERMINAL, AND BASE STATION

(71) Applicant: SPREADTRUM COMMUNICATIONS (SHANGHAI) CO., LTD., Shanghai (CN)

(72) Inventors: Huayu Zhou, Shanghai (CN); Xinghang Gao, Shanghai (CN); Dawei Ma, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 463 days.

(21) Appl. No.: 17/289,538

(22) PCT Filed: Oct. 17, 2019

(86) PCT No.: PCT/CN2019/111608
§ 371 (c)(1),
(2) Date: Apr. 28, 2021

(87) PCT Pub. No.: WO2020/088257
PCT Pub. Date: May 7, 2020

(65) Prior Publication Data
US 2021/0400585 A1   Dec. 23, 2021

(30) Foreign Application Priority Data
Nov. 2, 2018 (CN) .............................. 201811302228

(51) Int. Cl.
*H04W 76/28* (2018.01)
*H04L 5/00* (2006.01)
(Continued)

(52) U.S. Cl.
CPC ....... *H04W 52/0235* (2013.01); *H04L 5/0048* (2013.01); *H04W 72/0446* (2013.01); *H04W 72/23* (2023.01); *H04W 76/28* (2018.02)

(58) Field of Classification Search
CPC ......... H04W 52/0235; H04W 72/0446; H04W 72/23; H04W 76/28; H04W 52/0216;
(Continued)

(56) References Cited

U.S. PATENT DOCUMENTS

| | | | |
|---|---|---|---|
| 8,761,307 B1 | 6/2014 | Ionescu et al. | |
| 2004/0124970 A1 | 7/2004 | Fischer et al. | |

(Continued)

FOREIGN PATENT DOCUMENTS

| | | |
|---|---|---|
| CN | 101496309 A | 7/2009 |
| CN | 101651601 A | 2/2010 |

(Continued)

OTHER PUBLICATIONS

CNIPA Second Office Action for corresponding CN Application No. 201811302228.0; Dated, Apr. 25, 2021.
(Continued)

*Primary Examiner* — Julio R Perez
(74) *Attorney, Agent, or Firm* — CANTOR COLBURN LLP

(57) ABSTRACT

A wake-up signal resource determining method and apparatus, a wake-up signal resource configuration method and apparatus, a terminal, and a base station. The resource determining method comprises: receiving resource configuration information sent by a network; and determining, according to the resource configuration information, a fre-
(Continued)

at least one of a time domain resource and a frequency domain resource for a wake-up signal is determined to obtain resource configuration information — S201 the resource configuration information is transmitted to a UE — S202 quency domain resource and/or a time domain resource configured for awake-up signal. According to the technical solutions provided by embodiments of the present invention, resources for wake-up signals can be flexibly configured, and resource conflict between different wake-up signals is avoided.

17 Claims, 4 Drawing Sheets

(51) Int. Cl.
*H04W 52/02* (2009.01)
*H04W 72/0446* (2023.01)
*H04W 72/23* (2023.01)

(58) Field of Classification Search
CPC ........... H04W 52/0229; H04W 52/028; H04W 52/0212; H04W 72/0453; H04L 5/0048; H04L 5/0005; H04L 5/0091; H04L 5/0053; Y02D 30/70
See application file for complete search history.

(56) References Cited

U.S. PATENT DOCUMENTS

| | | | |
|---|---|---|---|
| 2007/0066329 A1 | 3/2007 | Laroia et al. | |
| 2020/0029302 A1 | 1/2020 | Cox et al. | |
| 2020/0059345 A1 | 2/2020 | Pelletier et al. | |
| 2022/0132527 A1* | 4/2022 | Cui | H04W 72/569 |
| 2022/0141694 A1* | 5/2022 | Miao | H04B 17/345 370/252 |
| 2022/0150950 A1* | 5/2022 | Islam | H04L 1/1896 |
| 2022/0167270 A1* | 5/2022 | Ye | H04J 13/0062 |
| 2022/0167407 A1* | 5/2022 | Oviedo | H04W 74/0808 |
| 2022/0183049 A1* | 6/2022 | Lee | H04W 76/20 |

FOREIGN PATENT DOCUMENTS

| | | |
|---|---|---|
| CN | 105554892 A | 5/2016 |
| CN | 107371194 A | 11/2017 |
| CN | 108023705 A | 5/2018 |
| CN | 108702707 A | 10/2018 |
| EP | 3799483 A1 | 3/2021 |
| WO | 2018085145 A1 | 5/2018 |
| WO | 2018175760 A1 | 9/2018 |

OTHER PUBLICATIONS

EPO Extended European Search Report for corresponding EP Application No. 19877749.2; Date of Mailing, Nov. 22, 2021.
Interdigital Inc, "On UE adaptation for power saving", 3GPP TSG RAN WG1 Meeting #94bis; R1-1811226; Oct. 8-12, 2018; 4 pages.
MCC Support, "Draft Report of 3GPP TSG RAN WG1 #94 v0.1.0 (Gothenburg, Sweden, Aug. 20-24, 2018)", 3GPP TSG RAN WG1 Meeting #94bis; R1-180xxxx; Oct. 8-12, 2018; 187 pages.
International Search Report for International Application No. PCT/CN/2019/111608; Mailing Date, Jan. 15, 2021.
Qualcomm Incorporated, "Wake-up signal configurations and procedures" 3GPP TSG RAN WG1 Meeting #90bis; Prague, Czechia, Oct. 9-13, 2017; R1-1718141, 7 pages.

* cited by examiner

WAKE-UP SIGNAL RESOURCE DETERMINING METHOD AND APPARATUS, WAKE-UP SIGNAL RESOURCE CONFIGURATION METHOD AND APPARATUS, TERMINAL, AND BASE STATION

CROSS-REFERENCE TO RELATED APPLICATIONS

This is the U.S. national stage of application No. PCT/CN2019/111608, filed on Oct. 17, 2019. Priority under 35 U.S.C. § 119(a) and 35 U.S.C. § 365(b) is claimed from Chinese Application No. 201811302228.0, filed Nov. 2, 2018, the disclosure of which is also incorporated herein by reference.

TECHNICAL FIELD

The present disclosure generally relates to radio communication technology field, and more particularly, to a wake-up signal resource determining method and apparatus, a wake-up signal resource configuration method and apparatus, a terminal, and a base station.

BACKGROUND

Fifth-Generation mobile communications (5G) New Radio (NR) systems will be deployed in the future. In the NR systems, a UE can enter a sleep state to save power consumption.

To the UE in the sleep state, a network may send a wake-up signal to wake up the UE so as to recover communication between the network and the UE. However, existing techniques haven't provided any solutions for resource allocation of wake-up signals.

SUMMARY

Embodiments of the present disclosure provide solutions for allocating resources for wake-up signals.

In an embodiment of the present disclosure, a wake-up signal resource determining method is provided, including: receiving resource configuration information from a network; and determining at least one of a frequency domain resource and a time domain resource configured for the wake-up signal based on the resource configuration information.

Optionally, Physical Resource Blocks (PRBs) configured for the wake-up signal are continuous, and the resource configuration information includes a frequency domain offset.

Optionally, the frequency domain offset is an offset between a PRB with a smallest index of the wake-up signal and a PRB with a smallest index of a Bandwidth Part (BWP).

Optionally, the frequency domain offset is an offset between a PRB with a smallest index of the wake-up signal and a first Common Resource Block (CRB).

Optionally, a number of PRBs configured for the wake-up signal is a preset number, and determining a frequency domain resource configured for the wake-up signal based on the resource configuration information includes: determining the frequency domain resource configured for the wake-up signal based on the offset included in the resource configuration information and the preset number.

Optionally, the resource configuration information further includes a number of PRBs configured for the wake-up signal, and determining a frequency domain resource configured for the wake-up signal based on the resource configuration information includes: determining the frequency domain resource configured for the wake-up signal based on the offset and the number of PRBs included in the resource configuration information.

Optionally, the resource configuration information includes Resource Indicator Vector (RIV) information for indicating the frequency domain resource configured for the wake-up signal.

Optionally, symbols configured for the wake-up signal are continuous, and the resource configuration information includes a time domain offset.

Optionally, the time domain offset is an offset between a start position of the time domain resource configured for the wake-up signal and a start position of a Discontinuous Reception (DRX) on-duration associated with the wake-up signal, or, the time domain offset is an offset between a start position of the time domain resource configured for the wake-up signal and a start position of a DRX cycle associated with the wake-up signal, a duration of the wake-up signal is a preset duration, and determining the time domain resource configured for the wake-up signal based on the resource configuration information includes: determining the time domain resource configured for the wake-up signal based on the offset included in the resource configuration information and the preset duration.

Optionally, the time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal, the resource configuration information further includes duration information of the wake-up signal which indicates a duration or a longest duration of the wake-up signal, and determining the time domain resource configured for the wake-up signal based on the resource configuration information includes: determining the time domain resource configured for the wake-up signal based on the offset and the duration information included in the resource configuration information.

Optionally, the resource configuration information includes Start and Length Indicator Value (SLIV) information for indicating the time domain resource configured for the wake-up signal.

Optionally, the resource configuration information includes resource grid information of the wake-up signal, wherein the resource grid information includes a plurality of candidate time-frequency resource units.

Optionally, the method further includes: receiving resource indication information from the network, wherein the resource indication information indicates the time-frequency resource units configured for the wake-up signal; and determining the time and frequency domain resources configured for the wake-up signal based on the resource indication information and the resource grid information.

Optionally, the resource indication information indicates the time-frequency resource units configured for the wake-up signal in bitmap or index.

Optionally, the resource indication information is received via Radio Resource Control (RRC) signaling, Medium Access Control (MAC) Protocol Data Unit (PDU), MAC Control Element (CE) or Downlink Control Information (DCI).

Optionally, the resource configuration information is transmitted via system information or RRC signaling.

Optionally, the method further includes: detecting the wake-up signal in a determined time-frequency resource.

Optionally, the method further includes: if the wake-up signal is detected in a time slot N, detecting a preset signal in a time slot (N+K), wherein the preset signal includes a tracking reference signal, and N and K are non-negative integers.

Optionally, the tracking reference signal includes an aperiodic tracking reference signal, and the wake-up signal is associated with the aperiodic tracking reference signal.

Optionally, the tracking reference signal includes an aperiodic tracking reference signal, and when the wake-up signal is detected in the time slot N, the method further includes: if a periodic tracking reference signal associated with the wake-up signal is received in a time slot (N+L) to a time slot (N+L+Q), and (N+L+Q)<=(N+K), not detecting the aperiodic tracking reference signal in the time slot (N+K).

Optionally, the method further includes: detecting a Physical Downlink Control Channel (PDCCH) in a time slot (N+K+P), wherein P is a non-negative integer.

Optionally, values of K and P are indicated by RRC signaling, MAC PDU or MAC CE.

In an embodiment of the present disclosure, a wake-up signal resource configuration method is provided, including: determining at least one of a time domain resource and a frequency domain resource for a wake-up signal to obtain resource configuration information; and transmitting the resource configuration information to a User Equipment (UE).

Optionally, PRBs configured for the wake-up signal are continuous, and the resource configuration information includes a frequency domain offset.

Optionally, the frequency domain offset is an offset between a PRB with a smallest index of the wake-up signal and a PRB with a smallest index of a BWP.

Optionally, the frequency domain offset is an offset between a PRB with a smallest index of the wake-up signal and a first CRB.

Optionally, the resource configuration information further includes a number of PRBs configured for the wake-up signal.

Optionally, the resource configuration information includes RIV information for indicating the frequency domain resource for the wake-up signal.

Optionally, symbols configured for the wake-up signal are continuous, and the resource configuration information includes a time domain offset.

Optionally, the time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal.

Optionally, the resource configuration information further includes duration information of the wake-up signal which indicates a duration or a longest duration of the wake-up signal.

Optionally, the resource configuration information includes SLIV information for indicating the time domain resource for the wake-up signal.

Optionally, the resource configuration information includes resource grid information of the wake-up signal, wherein the resource grid information includes a plurality of candidate time-frequency resource units.

Optionally, the method further includes: transmitting resource indication information to the UE, wherein the resource indication information indicates the time-frequency resource units configured for the wake-up signal, so that the UE determines the time and frequency domain resources configured for the wake-up signal based on the resource indication information and the resource grid information.

Optionally, the resource indication information indicates the time-frequency resource units configured for the wake-up signal in bitmap or index.

Optionally, the resource indication information is transmitted via RRC signaling, MAC PDU, MAC CE or DCI.

Optionally, the resource configuration information is transmitted via system information or RRC signaling.

Optionally, the method further includes: determining whether to transmit the wake-up signal in a time-frequency resource of the wake-up signal; and if it is determined to transmit the wake-up signal in the time-frequency resource of the wake-up signal, transmitting the wake-up signal.

Optionally, the method further includes: if the wake-up signal is transmitted in a time slot N, transmitting a preset signal in a time slot (N+K), wherein N and K are non-negative integers, and the preset signal includes a tracking reference signal.

Optionally, the tracking reference signal includes an aperiodic tracking reference signal, and the aperiodic tracking reference signal is associated with the wake-up signal.

Optionally, the tracking reference signal includes an aperiodic tracking reference signal, and when the wake-up signal is transmitted in the time slot N, the method further includes: if a periodic tracking reference signal associated with the wake-up signal is transmitted in a time slot (N+L) to a time slot (N+L+Q), and (N+L+Q)<=(N+K), not transmitting the aperiodic tracking reference signal in the time slot (N+K).

Optionally, the method further includes: transmitting a PDCCH in a time slot (N+K+P), wherein P is a non-negative integer.

Optionally, values of K and P are indicated by RRC signaling, MAC PDU or MAC CE.

In an embodiment of the present disclosure, a wake-up signal resource determining apparatus is provided, including: a first receiving circuitry configured to receive resource configuration information from a network; and a first determining circuitry configured to determine at least one of a frequency domain resource and a time domain resource configured for the wake-up signal based on the resource configuration information.

In an embodiment of the present disclosure, a wake-up signal resource configuration apparatus is provided, including: a first determining circuitry configured to determine at least one of a time domain resource and a frequency domain resource for a wake-up signal to obtain resource configuration information; and a first transmitting circuitry configured to transmit the resource configuration information to a UE.

In an embodiment of the present disclosure, a storage medium having computer instructions stored therein is provided, wherein when the computer instructions are executed, any one of the above methods is performed.

In an embodiment of the present disclosure, a terminal including a memory and a processor is provided, wherein the memory has computer instructions stored therein, and when the processor executes the computer instructions, any one of the above methods is performed.

In an embodiment of the present disclosure, a base station including a memory and a processor is provided, wherein the memory has computer instructions stored therein, and when the processor executes the computer instructions, any one of the above methods is performed.

Embodiments of the present disclosure may provide following advantages.

In embodiments of the present disclosure, a wake-up signal resource determining method is provided, including: receiving resource configuration information from a network; and determining at least one of a frequency domain resource and a time domain resource configured for the wake-up signal based on the resource configuration information. With the embodiments of the present disclosure, at least one of the frequency domain resource and the time domain resource may be configured for the wake-up signal flexibly, which helps to avoid a resource conflict of different wake up signals.

Further, PRBs configured for the wake-up signal are continuous, and the resource configuration information includes a frequency domain offset. With the resource configuration information including a frequency domain offset, the UE is capable of determining the frequency domain resource for the wake-up signal.

Further, symbols configured for the wake-up signal are continuous, and the resource configuration information includes a time domain offset. With the resource configuration information including a time domain offset, the UE is capable of determining the time domain resource for the wake-up signal.

Further, the resource configuration information includes resource grid information of the wake-up signal, wherein the resource grid information includes a plurality of candidate time-frequency resource units. With the resource configuration information including resource grid information, the UE is capable of determining the time and frequency domain resources for the wake-up signal.

DETAILED DESCRIPTION

Figure 1:
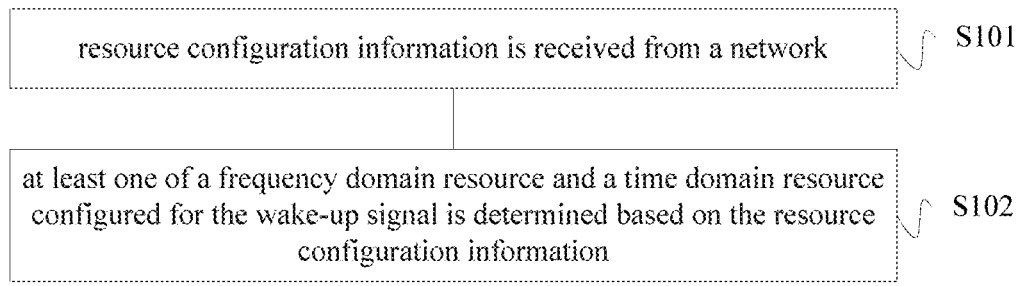
FIG. 1 is a flow chart of a wake-up signal resource determining method according to an embodiment.

As described in the background, existing techniques haven't provided any solutions for resource allocation of wake-up signals.

Specifically, in an NR system, synchronization signals and broadcast channel signals are transmitted in the form of Synchronization Signal and physical broadcast channel Block (SSB). Further, 5G systems also introduce beam sweeping and other functions. Each SSB can be regarded as a resource corresponding to a beam in the beam sweeping. The SSB includes a Primary Synchronization Signal (PSS), a Secondary Synchronization Signal (SSS), and a Physical Broadcast Channel (PBCH). Multiple SSBs form a synchronization signal burst which can be regarded as a relatively concentrated resource including multiple beams. Multiple synchronization signal bursts form a synchronization signal burst set. The SSB is repeatedly transmitted on different beams to complete the beam sweeping. Through beam sweeping training, a UE can determine on which beam a received signal is the strongest.

For example, it is assumed that time domain positions of L SSBs within a 5 millisecond (ms) window are fixed. That is, a transmission time of the SSBs within the 5 ms window is fixed, and indexes are also fixed. The indexes of the L SSBs are arranged continuously in a time domain position, from 0 to (L−1), and L is a positive integer.

Further, a new concept "BWP" is introduced in the NR system, allowing NR UEs to use narrowband BWP to access the 5G systems and use broadband BWP to transmit services. The BWP used for service transmission is called activated BWP. For the NR system, a cell (for example, a Primary Cell (PCell)) may include multiple BWPs, and each BWP occupies a limited bandwidth.

Further, a base station may configure a Control Resource Set (CORESET) and a search space set for the BWP. CORESET includes a frequency domain resource location, a number of time domain symbols, Control Channel Element (CCE) to Resource Element Group (REG) (i.e., CCE-to-REG) mapping and other information of PDCCH monitored by the UE. The search space set includes a time slot cycle, a starting symbol position in a time slot and an aggregation level of the PDCCH monitored by the UE. A search space set is bound to a control resource set, both of which determine a set of time-frequency resources which is referred to as "time-frequency resources of the search space set and the corresponding control resource set".

There are two types of search space sets including common search space (or common search space set) and UE specific search space (UE specific search space set).

The UE may blindly detect the PDCCH in one or more configured search space sets. In the search space set, the UE may blindly detect PDCCH candidates based on a preset rule, and detect DCI based on Radio Network Temporary Identifier (RNTI).

For each search space set, the number of candidate DCI that the UE needs to detect may be one or more.

Further, a control resource set 0 (CORESET0) is a CORESET of Remaining Minimum System Information (RMSI) PDCCH monitored by the UE that initially accesses by default. A search space set 0 (SS0) is a search space set of RMSI PDCCH monitored by the UE that initially accesses by default. The search space set 0 is a common search space or a common search space set. The UE initially accesses monitors candidate PDCCHs in the control resource set 0 and the search space set 0 by default, that is, by default, the search space set 0 can be bound to the control resource set 0, and the search space set 0 and its bound control resource set 0 determine a group of time-frequency resources which may be referred to as "time-frequency resources of the search space set 0 and the corresponding control resource set 0". In addition, other common search space sets may also be bound to the control resource set 0, and other common search space sets and their bound control resource set 0 determine a group of time-frequency resources which may be referred to as "time-frequency resources of the common search space set and the corresponding control resource set 0". In addition, other common search space sets may be bound to other control resource sets other than the control resource set 0, and other common search space sets and their bound other control resource sets other than the control resource set 0 determine a group of time-frequency resources which may be referred to as "time-frequency resources of the common search space set and corresponding other control resource sets except the control resource set 0".

Generally, the UE needs to monitor the PDCCH during an DRX on-duration. However, the base station may neither schedule the UE during the DRX on-duration, nor transmit the PDCCH to the UE. In scenarios such as low mobility, the UE may detect a wake-up signal before the DRX on-duration or DRX cycle to determine whether the PDCCH needs to be monitored during the DRX on-duration or DRX cycle, thereby reducing complexity of the UE to save power. However, how to allocate resources for the wake-up signal and how to optimize the wake-up signal to better adapt to the existing 5G NR systems has not yet been resolved.

In embodiments of the present disclosure, a wake-up signal resource determining method is provided, including: receiving resource configuration information from a network; and determining at least one of a frequency domain resource and a time domain resource configured for the wake-up signal based on the resource configuration information. With the embodiments of the present disclosure, at least one of the frequency domain resource and the time domain resource may be configured for the wake-up signal flexibly, which helps to avoid a resource conflict of different wake-up signals.

In order to clarify the objects, characteristics and advantages of the disclosure, embodiments of present disclosure will be described in detail in conjunction with accompanying drawings.

FIG. 1 is a flow chart of a wake-up signal resource determining method according to an embodiment. The method may be applied in a UE, i.e., performed by the UE. In some embodiments, the method may include S101 and S102.

In S101, resource configuration information is received from a network.

In S102, at least one of a frequency domain resource and a time domain resource configured for the wake-up signal is determined based on the resource configuration information.

In some embodiments, the wake-up signal may be a signal different from an SSB, which needs to be periodically detected by the UE, and may be used to wake up the UE to perform PDCCH detection or used to resynchronize the UE, and so on.

In S101, a network-side device (for example, a base station) may transmit resource configuration information to the UE, where the resource configuration information may be used to indicate the time domain resource configured for the wake-up signal, or to indicate the frequency domain resource configured for the wake-up signal, or to indicate the time and frequency domain resources configured for the wake-up signal.

In S102, the UE may determine the frequency domain resource or the time domain resource configured for the wake-up signal based on the resource configuration information.

Generally, the UE may detect the wake-up signal before a DRX on-duration or a DRX cycle. Alternatively, the UE may detect the wake-up signal before a configured cycle of the wake-up signal, so that the cycle for the UE to detect the wake-up signal may be different from the DRX cycle, which increases flexibility. Before detecting the wake-up signal, it is also necessary to determine the time and frequency domain resources configured for the wake-up signal, so that the UE can receive the wake-up signal on the time and frequency domain resources.

In some embodiments, the resource configuration information may be used to configure the frequency domain resource for the UE. Alternatively, the resource configuration information may be used to configure the time domain resource for the UE. Alternatively, the resource configuration information may be used to configure the time domain resource and the frequency domain resource together for the UE.

In some embodiments, when the resource configuration information is used to configure the frequency domain resource for the UE, the frequency domain resource configured by the base station for the UE may be continuous.

In some embodiments, the resource configuration information may include a frequency domain offset. In some embodiments, if a number of PRBs configured for the wake-up signal is fixed, the number of PRBs can serve as a preset number. For the UE and the base station, the preset number is known. There is no need for the base station to set the preset number, or to transmit signaling associated with the preset number.

In some embodiments, the frequency domain offset is an offset between a PRB with a smallest index of the wake-up signal and a PRB with a smallest index of a BWP. The BWP may be an activated BWP. After the base station transmits the resource configuration information to the UE, the UE may learn a start position of the frequency domain resource of the wake-up signal based on location information of the PRB with the smallest index (or called a lowest PRB) in the BWP and the offset. Further, the UE may use a PRB index determined by a sum of a PRB index corresponding to the start position of the frequency domain resource and the preset number as an end position of the frequency domain resource. As the UE generally operates in a BWP, such as an activated BWP, the PRB with the smallest index in the BWP may serve as a reference point of the offset, thereby reducing signaling overhead.

Alternatively, the frequency domain offset is an offset between a PRB with a smallest index of the wake-up signal and a PRB with a smallest index of a CRB. The PRB with a smallest index of a CRB may also be referred to as a CRB with a smallest index, or an RB with a smallest index, or a first CRB, or CRB0. After the base station transmits the resource configuration information to the UE, the UE may learn a start position of the frequency domain resource of the wake-up signal based on location information of the CRB0 and the offset. Further, the UE may use a PRB index determined by a sum of a PRB index corresponding to the start position of the frequency domain resource and the preset number as an end position of the frequency domain resource. The CRB0 serving as a reference point of the offset may make the wake-up signal beyond the BWP, thereby improving flexibility.

In some embodiments, the frequency domain offset may include a PRB group level offset and a PRB level offset, where the PRB group includes several PRBs. In some embodiments, the PRB group may be a Resource Block Group (RBG), or a Physical Resource block Group or Physical Resource Group (PRG). The UE may merely obtain the PRB group level offset, where the UE assumes that the offset is an integer multiple of the PRB group. The UE may obtain both the PRB group level offset and the PRB level offset, where the UE can convert the offset into an integer multiple of the PRB, thereby finally obtaining the number of PRB offsets.

In some embodiments, if the number of PRBs configured for the wake-up signal is not fixed, the number of PRBs may be transmitted by the base station to the UE. Specifically, after determining the number of PRBs of the wake-up signal, the base station may put the number of PRBs of the wake-up signal into the resource configuration information to be transmitted to the UE. In this case, the resource configuration information includes the frequency domain offset and the number of PRBs configured for the wake-up signal.

In some embodiments, the number of PRBs may include the number of PRB group levels and the number of PRB levels, where the PRB group includes several PRBs. In some embodiments, the PRB group may be an RBG, or a PRG. The UE may merely obtain the number of PRB group levels. The UE may obtain both the PRB group level offset and the PRB level offset. The UE may convert the PRB group into the number of PRBs. This ensures not only low signaling overhead, but also PRB level frequency domain resource granularity.

In some embodiments, the frequency domain offset is an offset between a PRB with a smallest index of the wake-up signal and a PRB with a smallest index of a BWP. The BWP may be an activated BWP. After the base station transmits the resource configuration information including the offset and the number of PRBs of the wake-up signal to the UE, the UE may learn a start position of the frequency domain resource of the wake-up signal based on location information of the PRB with the smallest index in the BWP and the offset. Further, the UE may use a PRB index determined by a sum of a PRB index corresponding to the start position of the frequency domain resource and the preset number as an end position of the frequency domain resource.

Alternatively, the frequency domain offset is an offset between a PRB with a smallest index of the wake-up signal and a first CRB. After the base station transmits the resource configuration information including the frequency domain offset and the number of PRBs of the wake-up signal to the UE, the UE may learn a start position of the frequency domain resource of the wake-up signal based on location information of the CRB0 and the offset. Further, the UE may use a PRB index determined by a sum of a PRB index corresponding to the start position of the frequency domain resource and the number of PRBs of the wake-up signal as an end position of the frequency domain resource.

In some embodiments, the resource configuration information includes RIV information for indicating the frequency domain resource configured for the wake-up signal. For example, the RIV information may jointly encode the start position of the frequency domain resource of the wake-up signal and the number of PRBs of the wake-up signal into one value. As an example of joint coding, the start position of the frequency domain resource of the wake-up signal is x, the number of PRBs of the wake-up signal is y, and the RIV information may jointly code x and y as z. After receiving z, the UE calculates the corresponding x and y. Based on the start position of the frequency domain resource of the wake-up signal and the number of PRBs included in the RIV information, the start position and the end position of the frequency domain resource of the wake-up signal may be deduced, which provides high flexibility in resource configuration.

In some embodiments, the RIV information may jointly encode the PRB group level start position of the frequency domain resource of the wake-up signal and the number of PRB groups of the wake-up signal into one value. For example, the PRB group level start position of the frequency domain resource of the wake-up signal is x, the number of PRB groups of the wake-up signal is y, and the RIV information may jointly encode x and y as z. After receiving z, the UE calculates the corresponding x and y.

In some embodiments, the frequency domain offset may include a PRB group level offset and a PRB level offset, where the PRB level offset is indicated by the RIV. The RIV information may jointly encode the PRB level start position of the frequency domain resource of the wake-up signal and the number of PRBs of the wake-up signal into one value. For example, the PRB level start position of the frequency domain resource of the wake-up signal is x, the number of PRBs of the wake-up signal is y, and the RIV information may jointly encode x and y as z. After receiving z, the UE calculates the corresponding x and y. The UE obtains the PRB group level offset via indication of the base station, and obtains the PRB level offset by obtaining the RIV information.

In some embodiments, the resource configuration information may include a time domain offset. The time domain offset may be a number of time slots, or a number of half time slots, or a number of partial time slots (for example, a number of symbols in the time slot). The time domain offset may include a slot level offset and a symbol level offset.

In some embodiments, if the number of symbols configured for the wake-up signal is fixed, a symbol duration defined by the fixed number may serve as a preset duration. For the UE and the base station, the preset duration is known, and there is no need for the base station to set the preset duration, or to transmit signaling associated with the preset duration. The preset duration may be a preset maximum duration, that is, the base station merely transmits part of the symbols of the wake-up signal, and a maximum duration does not need to be reached.

In some embodiments, the time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal. After the base station transmits the resource configuration information to the UE, the UE may determine a start position of the time domain resource of the wake-up signal based on the start position information of the DRX on-duration or the DRX cycle associated with the wake-up signal and the offset.

In some embodiments, the time domain offset may be an offset between the start position of the wake-up signal and a configured cycle of the wake-up signal. After the base station transmits the resource configuration information to the UE, the UE may determine the start position of the time domain resource of the wake-up signal based on start position information of the configured cycle of the wake-up signal and the offset.

In some embodiments, the time domain offset may include a time slot level offset and a symbol level offset. The UE may merely obtain the time slot level offset, where the UE assumes that the offset is an integer multiple of the time slot. The UE may obtain both the time slot level offset and the symbol level offset, where the UE may convert the offset into an integer multiple of the symbol to obtaining the number of symbol offsets.

Further, the UE may use a symbol position determined by a sum of the start position of the time domain resource and the preset duration as the end position of the time domain resource.

In some embodiments, if the number of symbols configured for the wake-up signal is not fixed, the base station may transmit duration information of the wake-up signal (for example, a duration of the wake-up signal) to the UE. In this case, the resource configuration information may include the time domain offset and the duration information of the wake-up signal. The duration information may be a duration or a maximum duration of the wake-up signal. When the maximum duration is configured, the base station may merely transmit part of the symbols of the wake-up signal, and the maximum duration does not need to be reached.

In some embodiments, the duration or the maximum duration of the wake-up signal may include a time slot level duration and a symbol level duration. The UE may merely obtain the time slot level duration. The UE may obtain both the time slot level duration and the symbol level duration. The UE may convert the time slot level duration to the symbol level duration. This ensures not only low signaling overhead, but also symbol level duration granularity.

Specifically, after determining the duration information of the wake-up signal, the base station may put the duration information of the wake-up signal into the resource configuration information to be transmitted to the UE, where the resource configuration information may include the time domain offset and the duration of the wake-up signal, or include the time domain offset and the maximum duration of the wake-up signal time. In this case, the UE may take a symbol position determined by a sum of the start position of the time domain resource and the duration information as the end position of the time domain resource.

In some embodiments, the resource configuration information includes SLIV information for indicating the time domain resource configured for the wake-up signal. For example, the SLIV information may jointly encode the start position of the time domain resource of the wake-up signal and the duration information of the wake-up signal into one value, where the duration information may be the duration or the maximum duration of the wake-up signal. In some embodiments, the start position of the time domain resource of the wake-up signal is x, the duration information of the wake-up signal is y, and the SLIV information may jointly code x and y as z. After receiving z, the UE calculates the corresponding x and y. After receiving the SLIV information from the base station, the UE may derive the start position and the end position of the time domain resource of the wake-up signal based on the start position of the time domain resource and the duration information of the wake-up signal included in the SLIV information, which provides high flexibility for resource configuration.

In some embodiments, the SLIV information may jointly encode the time slot level start position of the time domain resource of the wake-up signal and the time slot level duration information of the wake-up signal into one value. For example, the time slot level start position of the time domain resource of the wake-up signal is x, the time slot level duration information of the wake-up signal is y, and the SLIV information may jointly encode x and y as z. After receiving z, the UE calculates the corresponding x and y.

In some embodiments, the time domain offset may include a time slot level offset and a symbol level offset, where the symbol level offset is indicated by SLIV. The SLIV information may jointly encode the symbol level start position of the time domain resource of the wake-up signal and the symbol level duration information of the wake-up signal into one value. For example, the symbol level start position of the time domain resource of the wake-up signal is x, the symbol level duration information of the wake-up signal is y, and the SLIV information may jointly encode x and y as z. After receiving z, the UE calculates the corresponding x and y. The UE obtains the time slot level offset by obtaining the duration information of the wake-up signal, and obtains the symbol level offset by obtaining the SLIV information.

In some embodiments, the resource configuration information is used to jointly configure the frequency domain resource and the time domain resource of the wake-up signal for the UE.

In some embodiments, the resource configuration information includes resource grid information of the wake-up signal, wherein the resource grid information includes a plurality of candidate time-frequency resource units. Each candidate time-frequency resource unit may include x continuous PRBs and y continuous symbols, where x and y are positive integers. The wake-up signal of the UE may consist of N time-frequency resource units, and the time-frequency resource of the wake-up signal may be discontinuous.

In some embodiments, after determining each candidate time-frequency resource unit of the wake-up signal, the base station may transmit the resource configuration information via RRC signaling. The UE may obtain the resource grid information of the wake-up signal after receiving the resource configuration information. The RRC signaling may be system information which can be broadcast to a plurality of UEs, so as to reduce signaling overhead.

For the base station, after transmitting the resource configuration information, the base station may further transmit resource indication information to the UE to indicate the time-frequency resource unit configured for the wake-up signal. The resource indication information may indicate the time-frequency resource unit configured for the wake-up signal in bitmap or index. Afterward, the UE receives the resource indication information and may obtain the time-frequency resource of the wake-up signal. The resource indication information may be transmitted to the UE via RRC signaling. The RRC signaling may be dedicated RRC signaling, thereby a connected UE may configure resources for different wake-up signals.

Alternatively, the resource indication information may be transmitted to the UE via MAC PDU, MAC CE or DCI.

In some embodiments, after determining each candidate time-frequency resource unit of the wake-up signal, the base station may transmit the resource configuration information via RRC signaling. The UE may obtain the resource grid information of the wake-up signal after receiving the resource configuration information. The RRC signaling may be system information which can be broadcast to a plurality of UEs, so as to reduce signaling overhead.

For the base station, after transmitting the resource configuration information, the base station may further transmit resource indication information to the UE to indicate the time-frequency resource unit configured for the wake-up signal. The resource indication information may indicate the time-frequency resource unit configured for the wake-up signal in bitmap or index. Afterward, the UE receives the resource indication information and may obtain the time-frequency resource of the wake-up signal. The resource indication information may be transmitted to the UE via RRC signaling, MAC PDU, MAC CE or DCI. The RRC signaling may be dedicated RRC signaling, thereby a connected UE may configure resources for different wake-up signals.

Those skilled in the art could understand that the resource configured for the wake-up signal may completely overlap or partially overlap with a reserved resource. When the symbols in the wake-up signal completely or partially overlap with the reserved resource, the base station may postpone transmitting the symbols of the wake-up signal until the symbols of the wake-up signal no longer completely or partially overlap with the reserved resource. Accordingly, the UE may postpone receiving the symbols of the wake-up signal to prevent the symbols of the wake-up signal from completely or partially overlapping with the reserved resource. Alternatively, when multiple symbols of the wake-up signal completely or partially overlap with the reserved resource, the base station may postpone transmitting the symbols of the wake-up signal until the symbols of the wake-up signal no longer completely or partially overlap with the reserved resource, and the base station may drop symbols that exceed the duration or the maximum duration. Accordingly, the UE may postpone receiving the symbols of the wake-up signal to prevent the symbols of the wake-up signal from completely or partially overlapping with the reserved resources, and the UE may ignore symbols that exceed the duration or the maximum duration. Alternatively, when the symbols of the wake-up signal completely or partially overlap with the reserved resource, the base station may punch to transmit the overlapping part of the wake-up signal, and accordingly, the UE may punch to receive the overlapping part of the wake-up signal. The reserved resource may include SSBs or other signals or channels, which are not described in detail here.

The reserved resource may be a time-frequency resource of an SSB, a time-frequency resource of a search space set and a corresponding control resource set, a Rate Matching Resource (RMR), a time-frequency resource of a PDCCH, or a time-frequency resource of a Channel State Information Reference Signal (CSI-RS).

If the number of remaining symbols or the remaining duration of the wake-up signal after dropping symbols is less than a preset threshold, the UE may assume that the wake-up signal does not need to be detected and enter a DRX on-duration directly, which is beneficial to ensure detection performance of the wake-up signal.

When the base station determines to transmit the wake-up signal on the time-frequency resource of the wake-up signal, the UE may receive the wake-up signal on the determined resource. Afterward, the base station may further transmit other signals after transmitting the wake-up signal, such as a tracking reference signal. The tracking reference signal may include an aperiodic tracking reference signal which may be transmitted via RRC signaling.

In some embodiments, if the wake-up signal is detected in a time slot N, the UE may detect an Aperiodic Tracking Reference Signal (A-TRS) carried in RRC signaling, MAC PDU or MAC CE in a time slot (N+K), where K>=0. The A-TRS is also referred to as CSI-Reference Signal for tracking. By receiving the signaling from the base station, the UE may obtain the A-TRS associated with the wake-up signal. A value of K is indicated by the base station to the UE via RRC signaling, MAC PDU or MAC CE in advance.

In some embodiments, the UE may know in advance a periodic tracking reference signal associated with the wake-up signal. For example, the UE may obtain the periodic tracking reference signal associated with the wake-up signal by receiving signaling from the base station, and further obtain the A-TRS associated with the periodic tracking reference signal.

In some embodiments, when the wake-up signal is detected in the time slot N, and if it is predicted that the periodic tracking reference signal associated with the wake-up signal will be received in a time slot (N+L) to a time slot (N+L+Q), and (N+L+Q)<=(N+K), the UE may not need to detect the A-TRS in the time slot (N+K), so as to save power.

After the wake-up signal is detected in the time slot N, the UE may detect a PDCCH in a time slot (N+K+P), wherein L>=0, Q>=0, P>=0, and values of L, Q, K and P are indicated by RRC signaling, MAC PDU or MAC CE.

Figure 2:
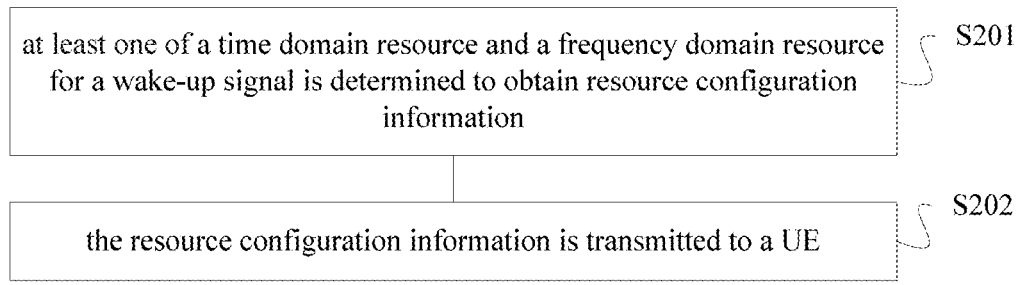
FIG. 2 is a flow chart of a wake-up signal resource configuration method according to an embodiment.

FIG. 2 is a flow chart of a wake-up signal resource configuration method according to an embodiment. The method may be applied in a network side, for example, performed by a base station at the network side.

The method may include S201 and S202.

In S201, at least one of a time domain resource and a frequency domain resource for a wake-up signal is determined to obtain resource configuration information.

In S202, the resource configuration information is transmitted to a UE.

In S201, in some embodiments, the base station may determine resource location information of at least one of the time and frequency domain resources configured for the wake-up signal, and take the determined resource location information as the resource configuration information.

In S202, the base station may transmit the resource configuration information to the UE. It should be noted that the resource configuration information may be transmitted via system information or RRC signaling.

In some embodiments, PRBs configured for the wake-up signal may be continuous, and the resource configuration information is used to indicate the frequency domain resource of the wake-up signal. In this case, the resource configuration information may include a frequency domain offset.

In some embodiments, the frequency domain offset is an offset between a PRB with a smallest index of the wake-up signal and a PRB with a smallest index of a BWP.

In some embodiments, the frequency domain offset is an offset between a PRB with a smallest index of the wake-up signal and a first CRB.

When the number of PRBs configured for the wake-up signal is a preset number, the UE may determine a start position of the frequency domain resource of the wake-up signal based on the offset. Afterwards, an end position of the frequency domain resource of the wake-up signal may be further determined based on the start position of the frequency domain resource and the preset number.

When the number of PRBs configured for the wake-up signal is a variable, the resource configuration information further includes the number of PRBs configured for the wake-up signal. In this case, the UE may determine the start position of the frequency domain resource of the wake-up signal based on the offset. Afterwards, the end position of the frequency domain resource of the wake-up signal may be further determined based on the start position of the frequency domain resource and the number of PRBs in the resource configuration information.

In some embodiments, the resource configuration information includes RIV information for indicating the frequency domain resource for the wake-up signal, so that the UE is capable of determining the frequency domain resource of the wake-up signal based on the RIV information.

In some embodiments, symbols configured for the wake-up signal are continuous, and the resource configuration information includes a time domain offset.

In some embodiments, the time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal. If duration information of the wake-up signal is a preset duration, the UE may determine the start position of the time domain resource of the wake-up signal based on the offset. Afterward, the end position of the time domain resource of the wake-up signal may be further determined based on the start position of the time domain resource and the preset duration.

Alternatively, when the duration information of the wake-up signal is variable, the resource configuration information may further include duration information of the wake-up signal, and the duration information is a duration or a maximum duration of the wake-up signal. The UE may determine the start position of the time domain resource of the wake-up signal based on the offset. Afterwards, the end position of the time domain resource of the wake-up signal may be further determined based on the start position of the time domain resource and the duration information in the resource configuration information.

Alternatively, the resource configuration information includes SLIV information for indicating the time domain resource for the wake-up signal, so that the UE is capable of determining the time domain resource of the wake-up signal based on the SLIV information.

In some embodiments, the resource configuration information includes resource grid information of the wake-up signal, wherein the resource grid information includes a plurality of candidate time-frequency resource units.

After transmitting the resource configuration information, the base station may further transmit resource indication information to the UE, wherein the resource indication information indicates the time-frequency resource units configured for the wake-up signal, so that the UE determines the time and frequency domain resources configured for the wake-up signal based on the resource indication information and the resource grid information. The resource indication information is transmitted via RRC signaling, MAC PDU, MAC CE or DCI.

In some embodiments, the resource indication information indicates the time-frequency resource units configured for the wake-up signal in bitmap or index.

Afterward, the base station may further determine whether to transmit the wake-up signal in a time-frequency resource of the wake-up signal; and if it is determined to transmit the wake-up signal in the time-frequency resource of the wake-up signal, transmitting the wake-up signal. If the wake-up signal is transmitted in a time slot N, a preset signal is transmitted in a time slot (N+K), wherein N and K are non-negative integers, and the preset signal includes a tracking reference signal.

The tracking reference signal includes an aperiodic tracking reference signal. The aperiodic tracking reference signal is associated with the wake-up signal, and may be transmitted via RRC signaling.

It should be noted that, when the wake-up signal is transmitted in the time slot N, if a periodic tracking reference signal associated with the wake-up signal is transmitted in a time slot (N+L) to a time slot (N+L+Q), and (N+L+Q) <=(N+K), the base station may not transmit the aperiodic tracking reference signal in the time slot (N+K).

Further, the base station may transmit a PDCCH in a time slot (N+K+P), wherein P is a non-negative integer. Values of K and P are indicated by RRC signaling, MAC PDU or MAC CE.

Those skilled in the art could understand that S201 and S202 can be regarded as steps corresponding to S101 and S102 in the embodiment as shown in FIG. 1, and the two are complementary to each other in terms of specific implementation principles and logic. Therefore, explanation of terms involved in the embodiment may be referred to related description of the embodiment as shown in FIG. 1, which is not described in detail here.

From above, with the embodiments of the present disclosure, the UE may determine the resource configured for the wake-up signal based on the resource configuration information received from the base station, or the resource configuration information and the resource indication information received from the base station. The base station flexibly configures resources for the wake-up signal, which is beneficial to avoid a resource conflict of different wake-up signals, and is particularly beneficial to flexible resource allocation of connected UEs.

Figure 3:
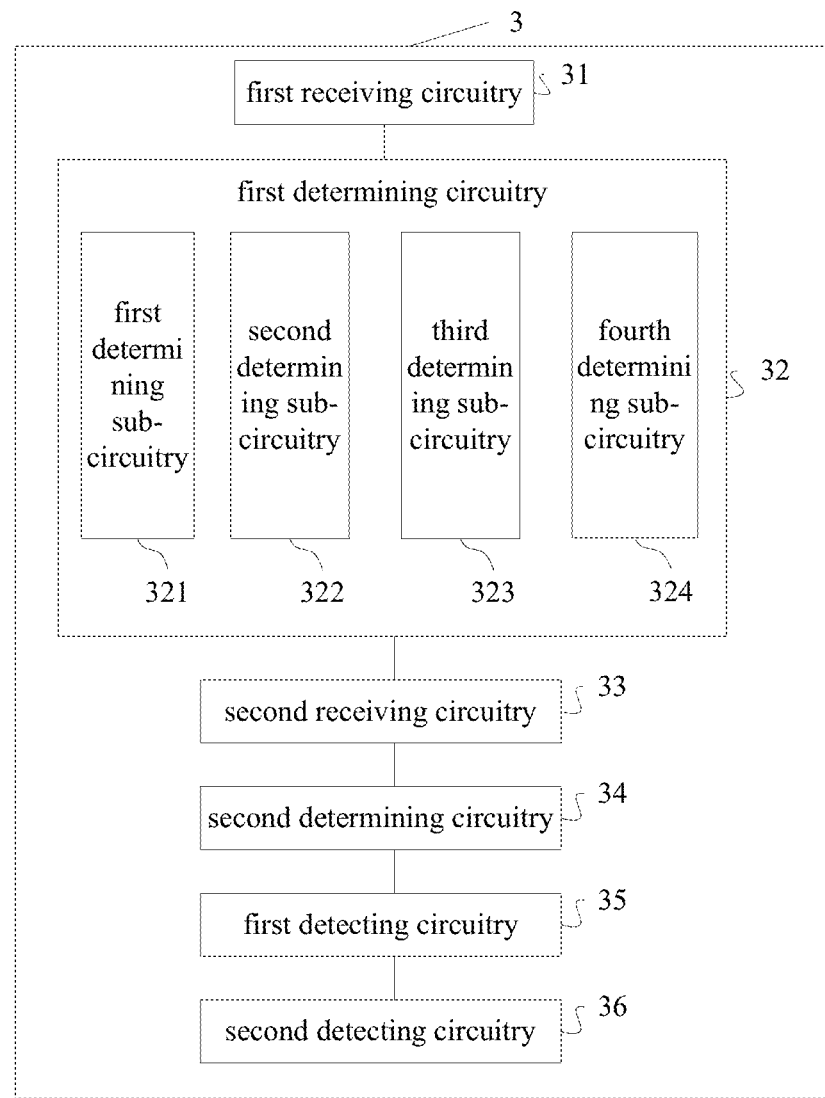
FIG. 3 is a structural diagram of a wake-up signal resource determining device according to an embodiment; an FIG. 4 is a structural diagram of a wake-up signal resource configuration device according to an embodiment.

FIG. 3 is a structural diagram of a wake-up signal resource determining device according to an embodiment. Referring to FIG. 3, the wake-up signal resource determining device 3 may be applied to a UE. Those skilled in the art could understand that the device may be used to implement technical solutions of the above method as shown in FIG. 1.

In some embodiments, the device 3 may include a first receiving circuitry 31 configured to receive resource configuration information from a network; and a first determining circuitry 32 configured to determine at least one of a frequency domain resource and a time domain resource configured for the wake-up signal based on the resource configuration information. The resource configuration information may be transmitted via system information or RRC signaling.

In some embodiments, PRBs configured for the wake-up signal are continuous, and the resource configuration information includes a frequency domain offset.

In some embodiments, the frequency domain offset is an offset between a PRB with a smallest index of the wake-up signal and a PRB with a smallest index of a BWP.

In some embodiments, the frequency domain offset is an offset between a PRB with a smallest index of the wake-up signal and a first CRB.

In some embodiments, a number of PRBs configured for the wake-up signal is a preset number, and the first determining circuitry 32 includes a first determining sub-circuitry 321 configured to determine the frequency domain resource configured for the wake-up signal based on the offset included in the resource configuration information and the preset number.

In some embodiments, the resource configuration information further includes a number of PRBs configured for the wake-up signal, and the first determining circuitry 32 includes a second determining sub-circuitry 322 configured to determine the frequency domain resource configured for the wake-up signal based on the offset and the number of PRBs included in the resource configuration information.

In some embodiments, the resource configuration information includes RIV information for indicating the frequency domain resource configured for the wake-up signal.

In some embodiments, symbols configured for the wake-up signal are continuous, and the resource configuration information includes a time domain offset.

In some embodiments, the time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal, a duration of the wake-up signal is a preset duration, and the first determining circuitry 32 includes a third determining sub-circuitry 323 configured to determine the time domain resource configured for the wake-up signal based on the offset included in the resource configuration information and the preset duration.

In some embodiments, the time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal, the resource configuration information further includes duration information of the wake-up signal which indicates a duration or a longest duration of the wake-up signal, and the first determining circuitry 32 includes a fourth determining sub-circuitry 324 configured to determine the time domain resource configured for the wake-up signal based on the offset and the duration information included in the resource configuration information.

In some embodiments, the resource configuration information includes SLIV information for indicating the time domain resource configured for the wake-up signal.

In some embodiments, the resource configuration information includes resource grid information of the wake-up signal, wherein the resource grid information includes a plurality of candidate time-frequency resource units. In this case, the device 3 further includes: a second receiving circuitry 33 configured to receive resource indication information from the network, wherein the resource indication information indicates the time-frequency resource units configured for the wake-up signal; and a second determining circuitry 34 configured to determine the time and frequency domain resources configured for the wake-up signal based on the resource indication information and the resource grid information.

In some embodiments, the resource indication information indicates the time-frequency resource units configured for the wake-up signal in bitmap or index. The resource indication information is received via RRC signaling, MAC PDU, MAC CE or DCI.

In some embodiments, the device 3 further includes a first detecting circuitry 35 configured to detect the wake-up signal in a determined time-frequency resource.

In some embodiments, the device 3 further includes a second detecting circuitry 36 configured to: if the wake-up signal is detected in a time slot N, detect a preset signal in a time slot (N+K), wherein the preset signal includes a tracking reference signal, and N and K are non-negative integers.

In some embodiments, the tracking reference signal includes an aperiodic tracking reference signal which is associated with the wake-up signal and may be received via RRC signaling.

In some embodiments, when the wake-up signal is detected in the time slot N, if a periodic tracking reference signal associated with the wake-up signal is received in a time slot (N+L) to a time slot (N+L+Q), and (N+L+Q)<= (N+K), the second detecting circuitry 36 may not detect the aperiodic tracking reference signal in the time slot (N+K).

In some embodiments, the device 3 further includes a third detecting circuitry 37 configured to detect a PDCCH in a time slot (N+K+P), wherein P is a non-negative integer. Values of K and P are indicated by RRC signaling, MAC PDU or MAC CE.

More details on working principles and working methods of the device 3 may be referred to related descriptions of FIG. 1, and are not described in detail here.

Figure 4:
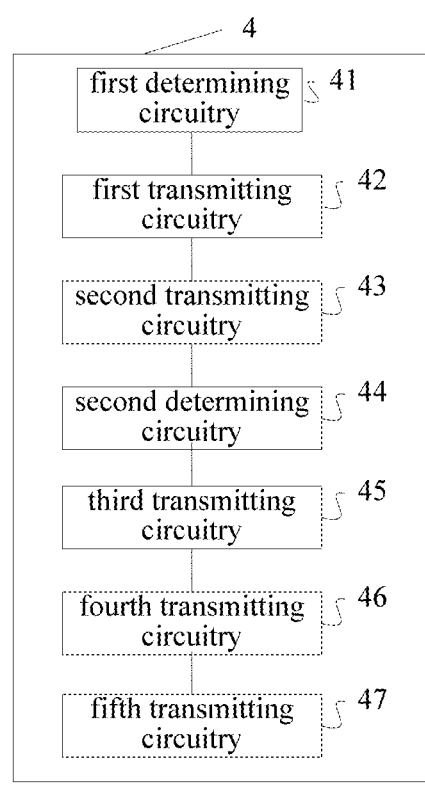

FIG. 4 is a structural diagram of a wake-up signal resource configuration device according to an embodiment. The wake-up signal resource configuration device 4 may be applied to a network side, for example, a base station. Those skilled in the art could understand that the device may be used to implement technical solutions of the above method as shown in FIG. 2.

In some embodiments, the device 4 may include: a first determining circuitry 41 configured to determine at least one of a time domain resource and a frequency domain resource for a wake-up signal to obtain resource configuration information; and a first transmitting circuitry 42 configured to transmit the resource configuration information to a UE. The resource configuration information may be transmitted via system information or RRC signaling.

In some embodiments, PRBs configured for the wake-up signal are continuous, and the resource configuration information includes a frequency domain offset.

In some embodiments, the frequency domain offset is an offset between a PRB with a smallest index of the wake-up signal and a PRB with a smallest index of a BWP.

In some embodiments, the frequency domain offset is an offset between a PRB with a smallest index of the wake-up signal and a first CRB.

In some embodiments, the resource configuration information further includes a number of PRBs configured for the wake-up signal.

In some embodiments, the resource configuration information includes RIV information for indicating the frequency domain resource configured for the wake-up signal.

In some embodiments, symbols configured for the wake-up signal are continuous, and the resource configuration information includes a time domain offset. The time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal.

In some embodiments, when a number of symbols configured for the wake-up signal is variable, the resource configuration information may further include duration information of the wake-up signal, and the duration information is a duration or a maximum duration of the wake-up signal.

In some embodiments, the resource configuration information includes SLIV information for indicating the time domain resource configured for the wake-up signal.

In some embodiments, the resource configuration information includes resource grid information of the wake-up signal, wherein the resource grid information includes a plurality of candidate time-frequency resource units. In this case, the device 4 further includes: a second transmitting circuitry 43 configured to transmit resource indication information to the UE, wherein the resource indication information indicates the time-frequency resource units configured for the wake-up signal, so that the UE determines the time and frequency domain resources configured for the wake-up signal based on the resource indication information and the resource grid information.

In some embodiments, the resource indication information indicates the time-frequency resource units configured for the wake-up signal in bitmap or index. The resource indication information is transmitted via RRC signaling, MAC PDU, MAC CE or DCI.

In some embodiments, the device 4 further includes a second determining circuitry 44 configured to determine whether to transmit the wake-up signal in a time-frequency resource of the wake-up signal; and a third transmitting circuitry 45 configured to: if it is determined to transmit the wake-up signal in the time-frequency resource of the wake-up signal, transmit the wake-up signal.

In some embodiments, the device 4 further includes a fourth transmitting circuitry 46 configured to: if the wake-up signal is transmitted in a time slot N, transmit a preset signal in a time slot (N+K), where N and K are non-negative integers, and the preset signal includes a tracking reference signal.

In some embodiments, the tracking reference signal includes an aperiodic tracking reference signal which is associated with the wake-up signal and may be transmitted via RRC signaling.

In some embodiments, when the wake-up signal is detected in the time slot N, if a periodic tracking reference signal associated with the wake-up signal is transmitted in a time slot (N+L) to a time slot (N+L+Q), and (N+L+Q)<= (N+K), the fourth transmitting circuitry 46 may not transmit the aperiodic tracking reference signal in the time slot (N+K).

In some embodiments, the device 4 further includes a fifth transmitting circuitry 47 configured to transmit a PDCCH in a time slot (N+K+P), wherein P is a non-negative integer. Values of K and P are indicated by RRC signaling, MAC PDU or MAC CE.

More details on working principles and working methods of the device 4 may be referred to related descriptions of FIG. 2, and are not described in detail here.

Signaling interaction between a UE and a network (for example, an NR base station) adopting the embodiments of the present disclosure is further described below in conjunction with a typical application scenario.

Figure 5:
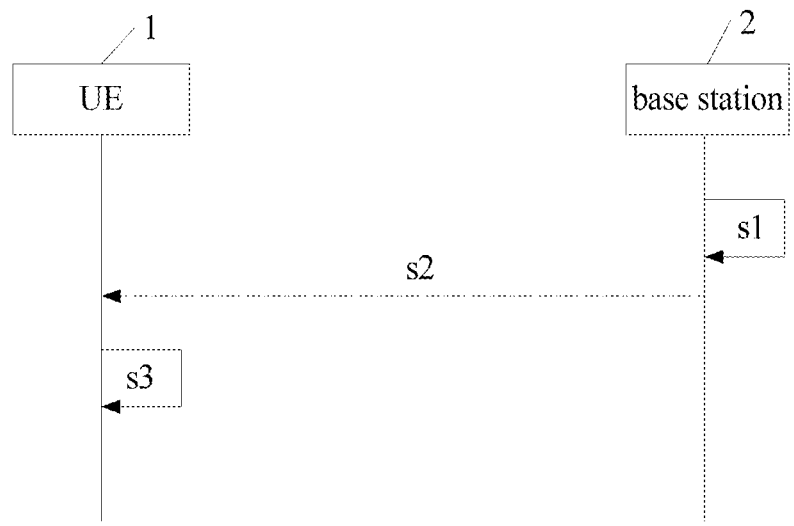
FIG. 5 is a signaling interaction diagram of a typical application scenario according to an embodiment.

In a typical application scenario, referring to FIG. 5, after a UE 1 accesses a base station 2 in a network, the base station 2 may first perform s1, that is, determine time and frequency domain resources of a wake-up signal to obtain resource configuration information.

When the resource configuration information is used to indicate the frequency domain resource of the wake-up signal and the frequency domain resource of the wake-up signal is a continuous resource, if a number of PRBs configured for the wake-up signal is a preset number, the wake-up signal may merely include a frequency domain offset; if the number of PRBs configured for the wake-up signal is variable, the wake-up signal may not merely include the frequency domain offset, but also include the number of PRBs configured for wake-up signal. Alternatively, the resource configuration information may further include RIV information used to indicate the frequency domain resource of the wake-up signal. For example, the RIV information may include a start position of the frequency domain resource and the number of PRBs configurated for the wake-up signal.

When the resource configuration information is used to indicate the time domain resource of the wake-up signal and the time-domain resource of the wake-up signal is a continuous resource, if a duration of the wake-up signal is a preset duration, the wake-up signal may merely include a time-domain offset; if the duration of the wake-up signal is variable, the wake-up signal may include a duration or a maximum duration of the wake-up signal in addition to the time-domain offset. Alternatively, the resource configuration information may further include SLIV information used to indicate the time domain resource of the wake-up signal. For example, the SLIV information may include a start position of the time domain resource and duration information, where the duration information is the duration or the maximum duration of the wake-up signal.

Afterward, the base station 2 may perform s2, that is, transmit the resource configuration information to the UE 1.

Further, the UE 1 receives the resource configuration information, and the UE 1 may perform s3, that is, determine the resource configured for the wake-up signal based on the resource configuration information.

Figure 6:
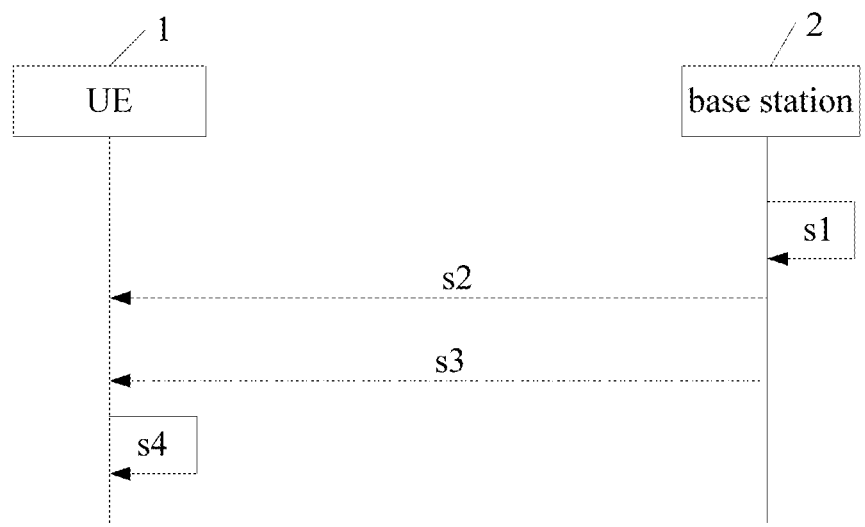
FIG. 6 is a signaling interaction diagram of a typical application scenario according to an embodiment.

In another typical application scenario, referring to FIG. 6, after a UE 1 accesses a base station 2 in a network, the base station 2 may first perform s1, that is, determine time and frequency domain resources of a wake-up signal to obtain resource configuration information. The resource configuration information may include resource grid information of the wake-up signal, and the resource grid information includes a plurality of candidate time-frequency resource units.

Afterward, the base station 2 may perform s2, that is, transmit the resource configuration information to the UE 1. The resource configuration information may be transmitted via system information or RRC signaling.

Further, the base station 2 may perform s3, that is, transmit resource indication information to the UE 1. The resource indication information may indicate the time-frequency resource unit configured for the wake-up signal in bitmap or index.

Further, after receiving the resource indication information, the UE 1 may perform s4, that is, determine the frequency domain resource configured for the wake-up signal based on the resource configuration information and the resource indication information. The resource indication information may be received via RRC signaling, MAC PDU or DCI.

More details on working principles and working methods of the UE 1 and the base station 2 in the application scenarios as shown in FIG. 5 and FIG. 6 may be referred to related descriptions of FIG. 1 and FIG. 2, and are not described in detail here.

In an embodiment of the present disclosure, a storage medium having computer instructions stored therein is provided, wherein when the computer instructions are executed, any one of the above methods as shown in FIG. 1 and FIG. 2 is performed. In some embodiments, the storage medium may include a computer readable storage medium, such as a non-volatile or non-transitory memory. The computer readable storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above method as shown in FIG. 1 is performed. The terminal may be a UE, such as an NR UE.

In an embodiment of the present disclosure, a base station including a memory and a processor is provided, wherein the memory has computer instructions stored therein, and when the processor executes the computer instructions, the above method as shown in FIG. 2 is performed. Specifically, the base station may be an NR base station, such as a gNB.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A wake-up signal resource determining method, comprising:
    receiving resource configuration information from a network; and
    determining at least one of a frequency domain resource and a time domain resource configured for the wake-up signal based on the resource configuration information;
    wherein Physical Resource Blocks (PRBs) configured for the wake-up signal are continuous, and the resource configuration information comprises a frequency domain offset;
    wherein the frequency domain offset is an offset between a PRB with a smallest index of the wake-up signal and a PRB with a smallest index of a Bandwidth Part (BWP).

2. The method according to claim 1, wherein a number of PRBs configured for the wake-up signal is a preset number, and determining a frequency domain resource configured for the wake-up signal based on the resource configuration information comprises:
    determining the frequency domain resource configured for the wake-up signal based on the offset included in the resource configuration information and the preset number.

3. The method according to claim 1, wherein the resource configuration information further comprises a number of PRBs configured for the wake-up signal, and determining a frequency domain resource configured for the wake-up signal based on the resource configuration information comprises:
    determining the frequency domain resource configured for the wake-up signal based on the offset and the number of PRBs included in the resource configuration information.

4. The method according to claim 1, wherein symbols configured for the wake-up signal are continuous, and the resource configuration information comprises a time domain offset.

5. The method according to claim 4, wherein the time domain offset is an offset between a start position of the time domain resource configured for the wake-up signal and a start position of a Discontinuous Reception (DRX) on-duration associated with the wake-up signal, or, the time domain offset is an offset between a start position of the time domain resource configured for the wake-up signal and a start position of a DRX cycle associated with the wake-up signal, a duration of the wake-up signal is a preset duration, and determining the time domain resource configured for the wake-up signal based on the resource configuration information comprises:
    determining the time domain resource configured for the wake-up signal based on the offset included in the resource configuration information and the preset duration.

6. The method according to claim 4, wherein the time domain offset is an offset between a start position of the time domain resource configured for the wake-up signal and a start position of a DRX on-duration associated with the wake-up signal, or, the time domain offset is an offset between a start position of the time domain resource configured for the wake-up signal and a start position of a DRX cycle associated with the wake-up signal, the resource configuration information further comprises duration information of the wake-up signal which indicates a duration or a longest duration of the wake-up signal, and determining the time domain resource configured for the wake-up signal based on the resource configuration information comprises:
    determining the time domain resource configured for the wake-up signal based on the offset and the duration information included in the resource configuration information.

7. The method according to claim 1, wherein the resource configuration information comprises resource grid information of the wake-up signal, wherein the resource grid information comprises a plurality of candidate time-frequency resource units.

8. The method according to claim 7, further comprising:
    receiving resource indication information from the network, wherein the resource indication information indicates the time-frequency resource units configured for the wake-up signal; and
    determining the time and frequency domain resources configured for the wake-up signal based on the resource indication information and the resource grid information.

9. The method according to claim 1, further comprising:
    detecting the wake-up signal in a determined time-frequency resource.

10. The method according to claim 9, further comprising:
    in response to the wake-up signal being detected in a time slot N, detecting a preset signal in a time slot (N+K), wherein the preset signal comprises a tracking reference signal, and N and K are non-negative integers.

11. The method according to claim 10, wherein the tracking reference signal comprises an aperiodic tracking reference signal, and the wake-up signal is associated with the aperiodic tracking reference signal.

12. The method according to claim 10, wherein the tracking reference signal comprises an aperiodic tracking reference signal, and in response to the wake-up signal being detected in the time slot N, the method further comprises:
    in response to a periodic tracking reference signal associated with the wake-up signal being received in a time slot (N+L) to a time slot (N+L+Q), and (N+L+Q)<= (N+K), not detecting the aperiodic tracking reference signal in the time slot (N+K).

13. The method according to claim 10, further comprising:
    detecting a Physical Downlink Control Channel (PDCCH) in a time slot (N+K+P), wherein P is a non-negative integer.

14. A wake-up signal resource configuration method, comprising:
    determining at least one of a time domain resource and a frequency domain resource for a wake-up signal to obtain resource configuration information; and
    transmitting the resource configuration information to a User Equipment (UE);
    wherein Physical Resource Blocks (PRBs), configured for the wake-up signal are continuous, and the resource configuration information comprises a frequency domain offset;
    wherein the frequency domain offset is an offset between a PRB with a smallest index of the wake-up signal and a PRB with a smallest index of a Bandwidth Part (BWP).

15. A non-transitory storage medium having computer instructions stored therein, wherein when the computer instructions are executed, the method of claim 1 is performed.

16. A terminal comprising a memory and a processor, wherein the memory has computer instructions stored therein, and when the processor executes the computer instructions, the method of claim 1 is performed.

17. A base station comprising a memory and a processor, wherein the memory has computer instructions stored therein, and when the processor executes the computer instructions, the method of claim 14 is performed.

* * * * *